United States Patent [19]
Van Den Hout

[11] Patent Number: 5,894,667
[45] Date of Patent: Apr. 20, 1999

[54] HAND TOOLS

[75] Inventor: Filip Van Den Hout, Palmerston North, New Zealand

[73] Assignee: Anne Lynch, Bulls, New Zealand

[21] Appl. No.: 08/917,946

[22] Filed: Aug. 27, 1997

[51] Int. Cl.$^6$ ................................................. B26B 15/00
[52] U.S. Cl. ................................................ 30/249; 30/249
[58] Field of Search ............................ 30/249, 245, 187, 30/188, 277, 272.1, 277.4, 228, 180

[56] References Cited

U.S. PATENT DOCUMENTS

| | | | |
|---|---|---|---|
| 2,504,405 | 4/1950 | Fletcher | 30/249 |
| 2,600,540 | 6/1952 | Johnson | 30/228 |
| 2,927,373 | 3/1960 | Taube | 30/247 |
| 3,039,189 | 6/1962 | McBerty | 30/228 |
| 3,670,411 | 6/1972 | Peters | 30/187 |
| 3,834,215 | 9/1974 | Lemley | 30/228 |
| 5,134,776 | 8/1992 | Moody | 30/187 |
| 5,341,572 | 8/1994 | Michelson | 30/249 |

FOREIGN PATENT DOCUMENTS 129101  5/1963  New Zealand .

OTHER PUBLICATIONS

"Hydraulic Handbook", *Trade and Technical Press Limited of England*, 6th Edition, pp. 122–123 and 436–440.

*Primary Examiner*—Hwei-Siu Payer
*Attorney, Agent, or Firm*—Young & Thompson

[57] ABSTRACT

A hand tool of a type where relative movement between operative elements is required. The hand tool includes a handpiece (C) and a separate fluid displacement device (P) which are coupled together by a flexible hose (H). The handpiece (C) has a fixed blade (36) and a movable blade (34). The displacement unit (P) has a handle (10) which can be moved relative to a ground engageable foot (18) thereby causing a piston (16) to displace fluid along the hose (H) and drive a piston (28) in handpiece (C) against the bias of a spring (38). Movement of piston (28) against the spring (38) causes cutting blade (34) to move toward blade (36). Spring (38) causes reverse movement of piston (28) upon pressure being released from the handle (10) to retract blade (34) from blade (36). The blades (34) and (36) can be replaced by other operative elements such as clamping jaws.

16 Claims, 1 Drawing Sheet

ND TOOLS

BACKGROUND OF THE INVENTION

1. Field of the Invention

This invention relates to hand tools and more particularly hand tools where relative movement between a pair of operative elements is required.

2. Description of the Related Art

Pruning tools and more particularly long handled pruning tools (commonly referred to as "loppers") are well known and in common usage. One of the problems with loppers is that despite the long handles it is often difficult to obtain the required mechanical advantage in order to achieve the required cutting action. This is especially the case when thick branches or the like are to be cut or where remotely positioned branches need to be accessed. Due to the length of the handles such access is often achieved by the user stretching to the utmost but due to this the required manipulation of the handles to achieve the cutting action cannot be carried out.

Yet again, there is often a problem associated with pruning tools where the user is unable to apply either the necessary squeezing action with a tool held in one hand. This can also be a problem with the so-called loppers where a handle is gripped in each hand of the user but strength factors can prevent the necessary purchase being applied.

SUMMARY OF THE INVENTION

The object of the present invention is to provide a hand tool whereby the mechanical advantage required to achieve relative movement of operative elements of the tool is achieved by means other than relative movement between a pair of handles.

Broadly in one aspect of the invention there is provided a hand tool comprising a handpiece and a separate fluid displacement device, the handpiece having a fluid powered actuator and pair of operative elements, one operative element being coupled to an operating member of the fluid powered actuator and the other fixed in position, a flexible conduit means communicating at one end with a first fluid chamber of the fluid powered actuator and at its other end with a second fluid chamber of the fluid displacement device, biasing means with the handpiece, the operating member being biased by said biasing means to a first position, the fluid displacement device having handle means and ground engagement means, the handle means being movable relative to the ground engagement means to cause fluid movement to occur in the first chamber resulting in movement of the operating member from said first position against the bias of the biasing means.

Broadly in a second aspect of the invention there is provided a hand tool comprising a hand holdable fluid powered actuator coupled by a flexible fluid conduit means to a fluid displacement device, the fluid powered actuator having operative elements mounted for relative movement therebetween, the fluid displacement device including a hand gripping means and a ground engagement means, said hand gripping means and said ground engagement means being mounted for relative movement therebetween to effect actuation of the fluid powered actuator, the fluid powered actuator having an operating member retained for movement against the action of biasing means, the operating member being coupled to at least one of said operative elements.

DESCRIPTION OF THE PREFERRED EMBODIMENTS

Figures 1, 2:
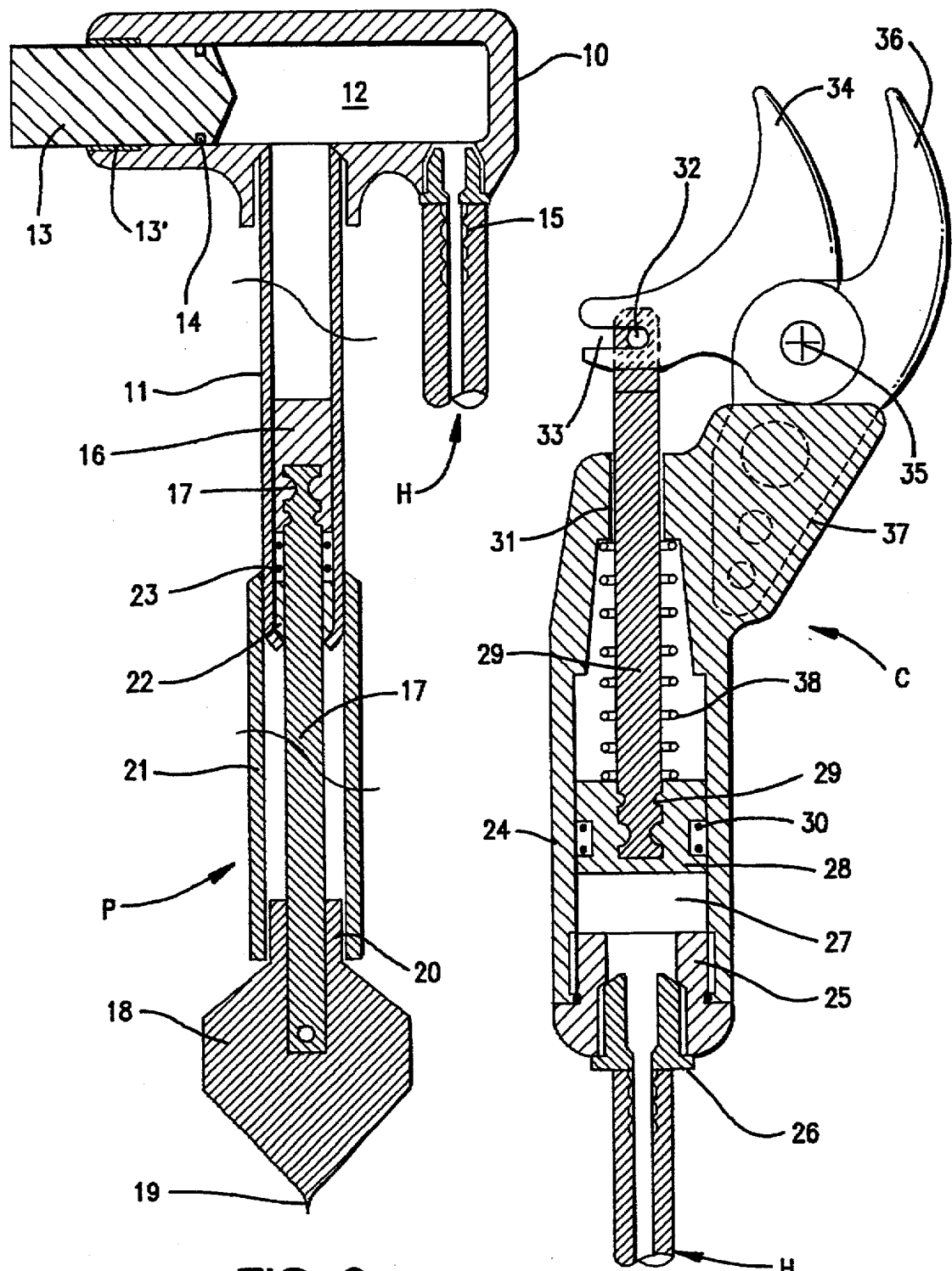
FIGS. 1 and 2 of the drawings are cross-sectioned elevation views of a hand tool forming a pruning device.

The hand tool according to the Invention could be used for other purposes such as a non-specific cutting implement, a clamping tool, an applicator tool for applying, say, a fastener and other such tools where relative movement between a pair of operative elements is required.

As shown in the drawings the device according to the invention comprises a cutting unit C and a fluid displacement unit P which are coupled together by a conduit in the form of flexible hydraulic hose H.

The fluid displacement unit P comprises a handle 10 which is dimensioned and shaped to fit within the hand of a user. Extending transversely from the handle 10 is a tubular element (tube) 11, this tube 11 opening into a fluid cavity 12 in the handle 10. One end of cavity 12 is closed by a bung 13 which is screw threaded at 13' into an open end of the cavity 12. A seal 14 is provided in a grooved recess in the bung 13 and sealingly engages with the inner wall of the cavity 12.

Also screw threaded into the handle 10 and communicating with chamber 12 is a hose nipple 15. One end of the hydraulic hose H is engaged with the nipple 15.

Slidingly engaged within tube 11 is a piston 16. A piston rod 17 extends from piston 16. The distal end of the piston rod 17 is attached to a foot 18 which in the preferred form as illustrated has a pointed lower end 19. Extending upwardly from foot 18 is a collar 20 and through which piston rod 17 engages into the foot. A protective tube 21 engages at one end with collar 20 while the other end of tube 21 overlaps that end of the tube 11 which is remote from handle 10.

Captured within this remote end of the tube 11 is a guide ring 22. Situated between the guide ring 22 and the piston 16 is at least one sealing ring 23.

The cutting unit C comprises a body 24 which is open at one end and has inserted therein a plug 25 with which is engaged a hose nipple 26. The other end of the previously mentioned hose H extending from nipple 15 of the fluid displacement unit P is connected to nipple 26.

Slidingly located within a bore 27 within the body 24 is a piston 28 from which extends an operating member in the form of a piston rod 29. One or more O-rings 30 are located in a peripheral recess in the piston 28 and slidingly engage with the inner peripheral wall surface of bore 27.

Piston rod 29 extends through a bore 31 in the body 24, this bore 31 being opposite to the end of the body in which the plug 25 is located. A pin 32 carried by the distal end of the piston rod 29 engages within a bifurcated portion 33 of a movable operative element, eg cutting knife 34. This cutting knife 34 is movable about a pivot 35 carried by another operative element, for example a fixed knife or anvil 36, which is mounted in a mounting portion 37 of body 24.

The body 24 is so shaped that it can comfortably fit within the hand of a user. Thus, in use of the device, body 24 is held in one hand of the user while handle 10 is held in the other hand. The user engages the pointed end 19 of foot 18 with a surface (usually the ground).

By applying a downward force the user pushes the handle 10 toward the foot 18. This results in piston 16 moving along tube 11 thereby displacing hydraulic fluid which fills the tube 11, chamber 12, hose H and the area behind piston 28 in body 24. As a result piston 28 moves toward bore 31 against the bias of a spring 38. The movement of the piston rod 29 thus, via pin 32, causes movable cutting knife 34 to move about pivot 35 toward the fixed cutting knife 36 in a cutting action.

As shown in the drawings the area of piston 16 is appreciably less than piston 28. Consequently, the force applied to the handle 10 appears as a higher force via piston rod 29 acting on the movable cutting blade 34.

Upon the cutting action being completed the user simply releases the downward force on the handle 10 whereupon piston 28, under the force of spring 38, is forced back toward plug 25 with the consequential movement of fluid causing piston 16 to be forced back toward the guiding ring 22. This renders the device operative for a further cycle by applying a further downward force on the handle 10.

Bung 13 not only functions as a filler bung for initial filling of hydraulic fluid into the device but also can be used as an adjustment knob to increase or decrease the hydraulic pressure.

The device thus provides a simple yet effective means of applying a driving force to a pair of operative elements which are movable relative to each other. Thus, in the application of a pruning device a user simply positions the cutting unit C so that the branch or the like to be cut is located between the cutting knives whereupon a cutting action is achieved by simply pushing downward on handle 10.

An extension piece can be coupled to body 24 of the cutting unit C so that the cutting knives 34 and 36 can be positioned more remote from the user such as to gain access to, for example, branches of a tree which would otherwise be outside the reach of the user.

By use of the present invention a greater cutting action is achievable at the same or a lower physical input by the user. Thus, once again with a pruning device a user can operate the cutting knives so as to cut branches or the like which would otherwise not be able to be cut using simple mechanical leverage by activating the cutting knives via a lever mechanism.

What is claimed is:

1. A hand tool comprising a hand holdable fluid powered actuator coupled by a flexible fluid conduit means to a fluid displacement device, the fluid powered actuator having operative elements mounted for relative movement therebetween, the fluid displacement device including a hand gripping means and a ground engagement means, said hand gripping means and said ground engagement means being mounted for relative movement therebetween to effect actuation of the fluid powered actuator, the fluid powered actuator having an operating member retained for movement against the action of biasing means, the operating member being coupled to at least one of said operative elements, the fluid displacement device further including first and second tubular elements slidingly interengaged, said hand gripping means being mounted with the first tubular element and the ground engagement means being mounted with the second tubular element, there being piston means slidingly engaged in the first tubular element and coupled by coupling means to the ground engagement means.

2. A hand tool as claimed in claim 1 wherein the operative elements form cutting means.

3. A hand tool as claimed in claim 1 wherein the ground engagement means includes a pointed portion.

4. A hand tool as claimed in claim 1 wherein the fluid displacement device further includes fluid pressure adjustment means, there being a fluid displacement element within the fluid displacement device having less cross-sectional area than a driven element located within the fluid powered actuator and movable in response to displacement of fluid by the displacement element, the driven element being coupled with said operating member, said biasing means acting against movement of the driven element as a consequence of said fluid displacement.

5. A hand tool comprising a handpiece and a separate fluid displacement device, the handpiece having a fluid powered actuator and pair of operative elements, one of said operative elements being coupled to an operating member of the fluid powered actuator and the other of said operative elements fixed in position, a flexible conduit means communicating at one end with a first fluid chamber of the fluid powered actuator and at its other end with a second fluid chamber of the fluid displacement device, biasing means within the handpiece, the operating member being biased by said biasing means to a first position, the fluid displacement device having handle means and ground engagement means, the handle means being movable relative to the ground engagement means to cause fluid movement to occur in the first fluid chamber resulting in movement of the operating member from said first position against the bias of the biasing means.

6. A hand tool as claimed in claim 5 wherein a first piston in the fluid displacement device is movable in response to relative movement between the handle means and the ground engagement means, said first piston being of less cross-sectional area than a second piston slidingly located in the first fluid chamber, said second piston being operatively connected to said operating member.

7. A hand tool as claimed in claim 6 wherein the ground engagement means has a pointed engagement portion.

8. A hand tool as claimed in claim 6 wherein the biasing means is a compression spring means.

9. A hand tool as claimed in claim 8 wherein the operative elements are a blade and an anvil.

10. A hand tool as claimed in claim 8 wherein the operative elements are a pair of cutting blades.

11. A hand tool as claimed in claim 6 wherein the fluid displacement device further includes a fluid pressure adjustment means.

12. A hand tool as claimed in claim 11 wherein a third fluid chamber is disposed between the first fluid chamber and said other end of the flexible conduit means, the fluid pressure adjustment means being a bung mounted for adjustable positioning in the third fluid chamber to adjust the effective volume of the third fluid chamber.

13. A hand tool as claimed in claim 12 wherein the third fluid chamber has an opening into which said bung is screw threaded, the bung being rotatable to move axially in the opening.

14. A hand tool as claimed in claim 6 wherein the handle means includes a first tubular element in which said first piston is slidingly located, a first piston rod coupled with said first piston and extending to said ground engagement means, said ground engagement means having a second tubular element within which at least a part of said first tubular element is slidingly located, said first tubular element communicating with a cavity in the handle means, said cavity being connected to said other end of the flexible conduit means.

15. A hand tool as claimed in claim 14 wherein the fluid powered actuator comprises a body having an internal bore at least forming part of said first fluid chamber and in which said second piston is slidingly engaged, there being a second piston rod coupled to said second piston and forming said operating member, said second piston rod extending from said body and engaging with said one operative element.

16. A hand tool as claimed in claim 15 wherein a distal end of the said second piston rod has a pin engaged in a bifurcated portion of said one operative element.

* * * * *